United States Patent
Kim et al.

(10) Patent No.: US 12,022,082 B2
(45) Date of Patent: Jun. 25, 2024

(54) METHOD FOR RECONSTRUCTING RESIDUAL BLOCKS OF CHROMA BLOCKS, AND VIDEO DECODING APPARATUS

(71) Applicant: SK TELECOM CO., LTD., Seoul (KR)

(72) Inventors: Jae Il Kim, Seoul (KR); Sun Young Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 92 days.

(21) Appl. No.: 17/764,289

(22) PCT Filed: Sep. 22, 2020

(86) PCT No.: PCT/KR2020/012774
§ 371 (c)(1),
(2) Date: Mar. 28, 2022

(87) PCT Pub. No.: WO2021/060804
PCT Pub. Date: Apr. 1, 2021

(65) Prior Publication Data
US 2022/0353505 A1    Nov. 3, 2022

(30) Foreign Application Priority Data

Sep. 27, 2019  (KR) .................. 10-2019-0119350
Apr. 2, 2020   (KR) .................. 10-2020-0040118

(51) Int. Cl.
*H04N 19/132*   (2014.01)
*H04N 19/176*   (2014.01)
(Continued)

(52) U.S. Cl.
CPC ......... *H04N 19/132* (2014.11); *H04N 19/176* (2014.11); *H04N 19/186* (2014.11); *H04N 19/70* (2014.11)

(58) Field of Classification Search
CPC .... H04N 19/11; H04N 19/119; H04N 19/132; H04N 19/176; H04N 19/186; H04N 19/50; H04N 19/70
(Continued)

(56) References Cited

U.S. PATENT DOCUMENTS

2015/0117519 A1   4/2015  Kim et al.
2018/0288437 A1  10/2018  Hsiang
(Continued)

FOREIGN PATENT DOCUMENTS

CN   104488270 A   4/2015
CN   105637866 A   6/2016
(Continued)

OTHER PUBLICATIONS

International Search Report dated Dec. 30, 2020, for corresponding International Patent Application No. PCT/KR2020/012774, along with an English translation.
(Continued)

*Primary Examiner* — Kathleen M Walsh
(74) *Attorney, Agent, or Firm* — Hauptman Ham, LLP

(57) ABSTRACT

A method for reconstructing residual blocks of chroma blocks, and a video decoding apparatus are disclosed. According to one embodiment of the present disclosure, a method for reconstructing residual blocks of chroma blocks on the basis of a joint coding of chroma residuals (JCCR) model comprises: determining the mode of the JCCR model based on a Cb chroma component syntax element and a Cr chroma component syntax element; generating, from transform coefficients of a chroma component corresponding to the mode of the JCCR model from among the Cb chroma component and the Cr chroma component, residual samples
(Continued)

of the corresponding chroma component; and deriving residual blocks of the chroma blocks by using the generated residual samples.

4 Claims, 13 Drawing Sheets

(51) Int. Cl.
*H04N 19/186* (2014.01)
*H04N 19/70* (2014.01)

(58) Field of Classification Search
USPC .................................................... 375/240.02
See application file for complete search history.

(56) References Cited

U.S. PATENT DOCUMENTS

| | | | |
|---|---|---|---|
| 2021/0058643 A1* | 2/2021 | Zhao | H04N 19/70 |
| 2021/0176478 A1 | 6/2021 | Na et al. | |
| 2021/0203990 A1 | 7/2021 | Choi et al. | |
| 2021/0266552 A1* | 8/2021 | Kotra | H04N 19/186 |
| 2022/0201301 A1* | 6/2022 | Xiu | H04N 19/174 |
| 2022/0295109 A1 | 9/2022 | Lee et al. | |
| 2022/0295110 A1 | 9/2022 | Lee et al. | |
| 2022/0295111 A1 | 9/2022 | Lee et al. | |
| 2022/0295112 A1 | 9/2022 | Lee et al. | |

FOREIGN PATENT DOCUMENTS

| | | |
|---|---|---|
| KR | 10-2016-0075556 A | 6/2016 |
| KR | 10-2018-010711 A | 9/2018 |
| KR | 10-2019-0083956 A | 7/2019 |
| WO | 2018/177419 A1 | 10/2018 |
| WO | 2019/135628 A1 | 7/2019 |

OTHER PUBLICATIONS

Written Opinion dated Dec. 30, 2020, for corresponding International Patent Application No. PCT/KR2020/012774.
Shunsuke Iwamura et al., "[AHG15] On scaling list for JCCR," Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-5.
L. Xu et al., "CE8-related: A SPS Level Flag For BDPCM and JCCR," Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-4.
Office Action dated Jul. 25, 2023, in connection with Chinese Patent Application No. 202080080030.1, with English machine translation (16 pages).
Zhao et al., "CE7-related: unification for joint chroma residue coding modes," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0508 (4 pages).
Iwamura et al., "[AHG15] On scaling list for JCCR." Joint Video Experts Team (JVET) of ITU-T SG 16 WP 3 and ISO/IEC JTC 1/SC 29/WG 11, 16th Meeting: Geneva, CH, Oct. 1-11, 2019, JVET-P0608r1 (6 pages).
Xu et al., "CE8-related: A SPS Level Flag For BDPCM and JCCR," Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0376-v32 (4 pages).

* cited by examiner

METHOD FOR RECONSTRUCTING RESIDUAL BLOCKS OF CHROMA BLOCKS, AND VIDEO DECODING APPARATUS

CROSS-REFERENCE TO RELATED APPLICATION

The present application is a national stage filing under 35 U.S.C § 371 of PCT application number PCT/KR2020/012774 filed on Sep. 22, 2020 which is based upon and claims the benefit of priorities to Korean Patent Application Nos. 10-2019-0119350, filed on Sep. 27, 2019 and 10-2020-0040118, filed on Apr. 2, 2020, in the Korean Intellectual Property Office. The disclosures of the above-listed applications are hereby incorporated by reference herein in their entireties.

FIELD OF THE DISCLOSURE

The present disclosure relates to video encoding and decoding and, more particularly, to a method for reconstructing residual blocks of chroma blocks and a video decoding apparatus, which more efficiently reconstruct the residual block of the chroma block.

BACKGROUND

Since video data has a large data volume compared to audio data or still image data, it requires a lot of hardware resources, including memory, to store or transmit the data in its raw form before undergoing a compression process.

Accordingly, storing or transmitting video data typically accompanies compression thereof by using an encoder before a decoder can receive, decompress, and reproduce the compressed video data. Existing video compression technologies include H.264/AVC and High Efficiency Video Coding (HEVC), which improves the encoding efficiency of H.264/AVC by about 40%.

However, the constant increase of video images in size, resolution, and frame rate and the resultant increase of data amount to be encoded require a new and superior compression technique with better encoding efficiency and higher image quality improvement over existing compression techniques.

SUMMARY

In view of this needs, the present disclosure is directed to providing an improved video encoding and decoding technique. In particular, one aspect of the present disclosure relates to a technique for improving encoding and decoding efficiency by deriving residual samples of chroma components related to a mode of a JCCR model.

In accordance with one aspect of the present disclosure, provided is a method for reconstructing residual blocks of chroma blocks based on a JCCR model. The method includes determining a mode of the JCCR model based on a Cb chroma component syntax element and a Cr chroma component syntax element; generating, from transform coefficients of a chroma component corresponding to the mode of the JCCR model between a Cb chroma component and a Cr chroma component, residual samples of the chroma component corresponding to the mode of the JCCR model; and deriving residual blocks of the chroma blocks using the generated residual samples.

In accordance with another aspect of the present disclosure, provided is a video decoding apparatus for reconstructing residual blocks of chroma blocks based on a JCCR model. The apparatus comprises a determination unit configured to determine a mode of the JCCR model based on a Cb chroma component syntax element and a Cr chroma component syntax element; a first derivation unit configured to generate, from transform coefficients of a chroma component corresponding to the mode of the JCCR model between the Cb chroma component and the Cr chroma component, residual samples of the chroma component corresponding to the mode of the JCCR; and a second derivation unit configured to derive residual blocks of the chroma blocks based on the generated residual samples.

As described above, according to some embodiments of the present disclosure, since residual coding is performed based on the correlation between the Cb chroma block and the Cr chroma block, residuals from only one of the Cb chroma block and the Cr chroma block may be signaled, which thereby improves compression performance.

DESCRIPTION OF EXEMPLARY EMBODIMENTS

Figure 1:
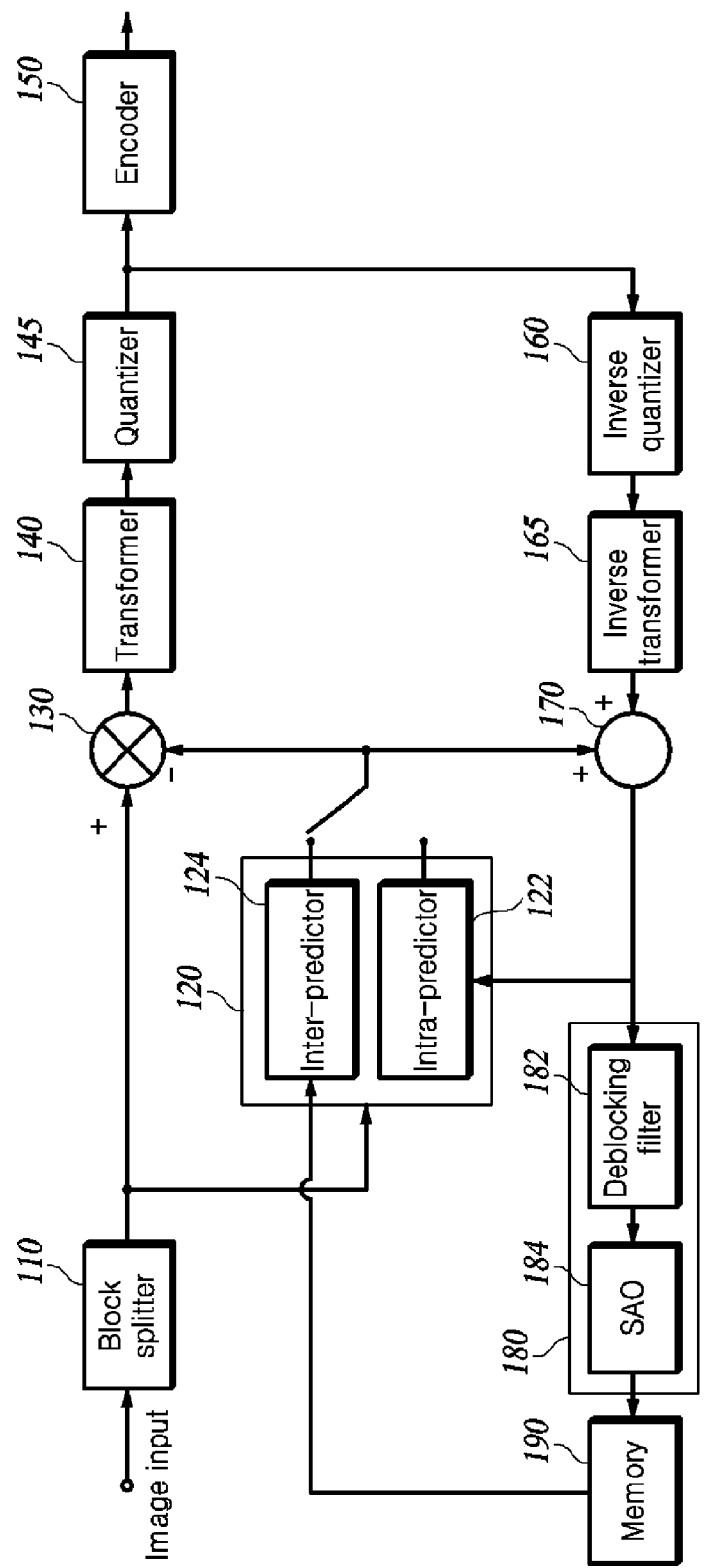
FIG. 1 is a block diagram illustrating a video encoding apparatus that can implement the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
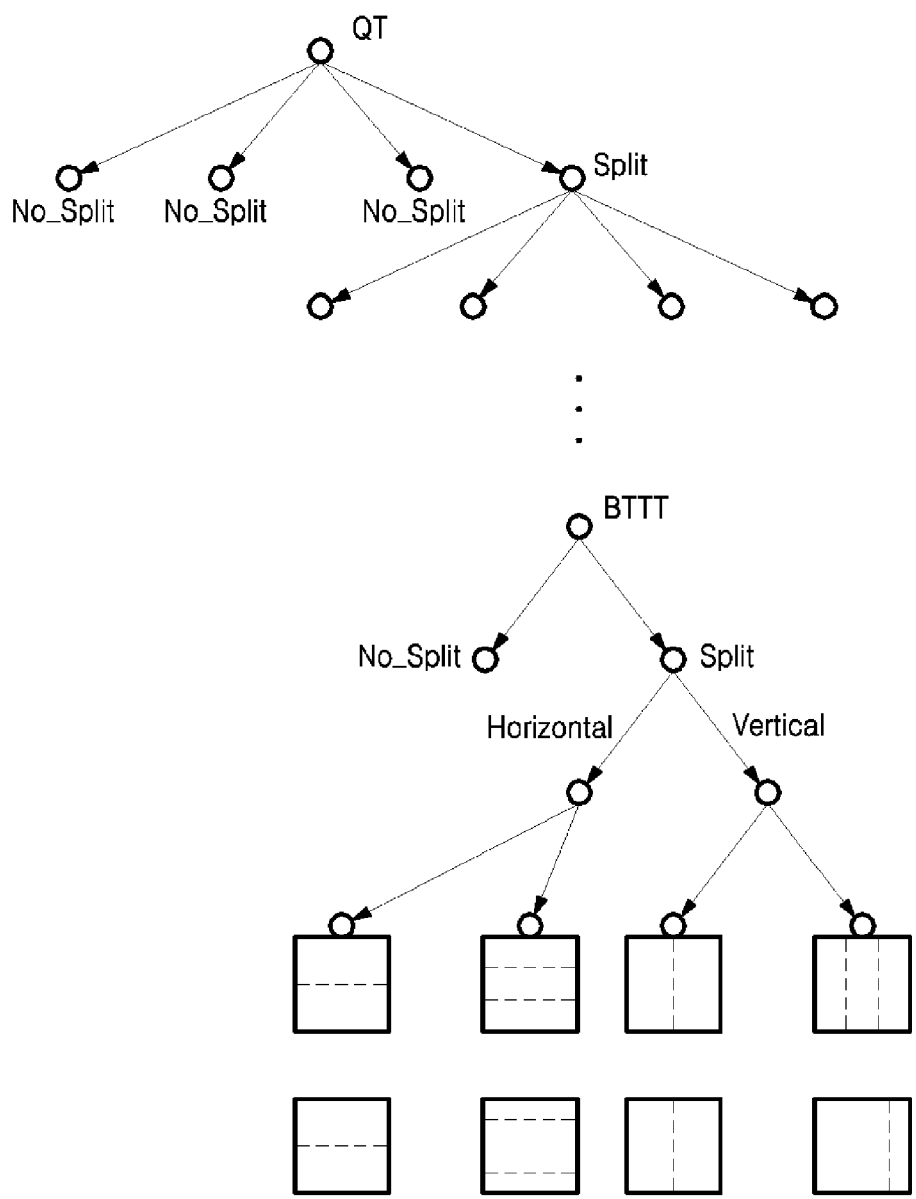
FIG. 2 is a diagram for explaining a method of splitting a block by using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has not been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
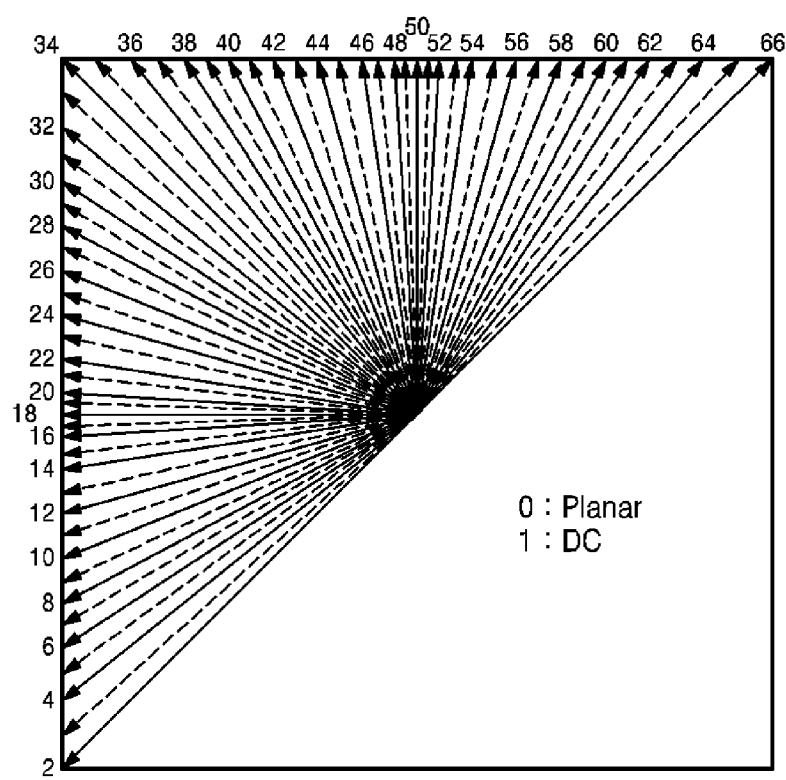
FIG. 3 is a diagram illustrating a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels within the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
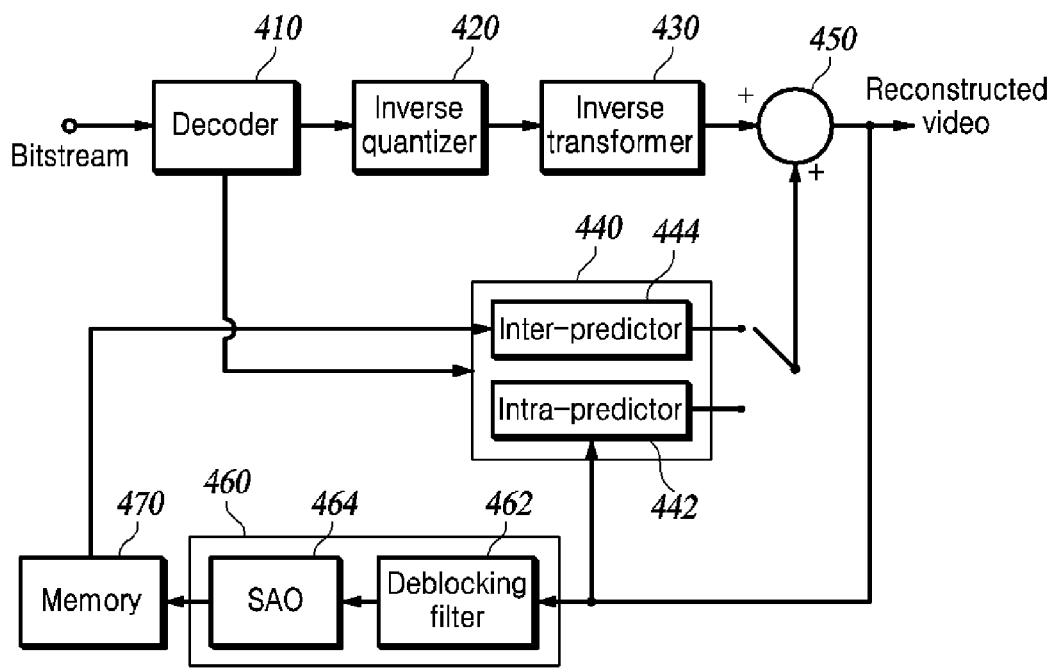
FIG. 4 is a block diagram illustrating a video decoding apparatus that can implement the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

Figure 5:
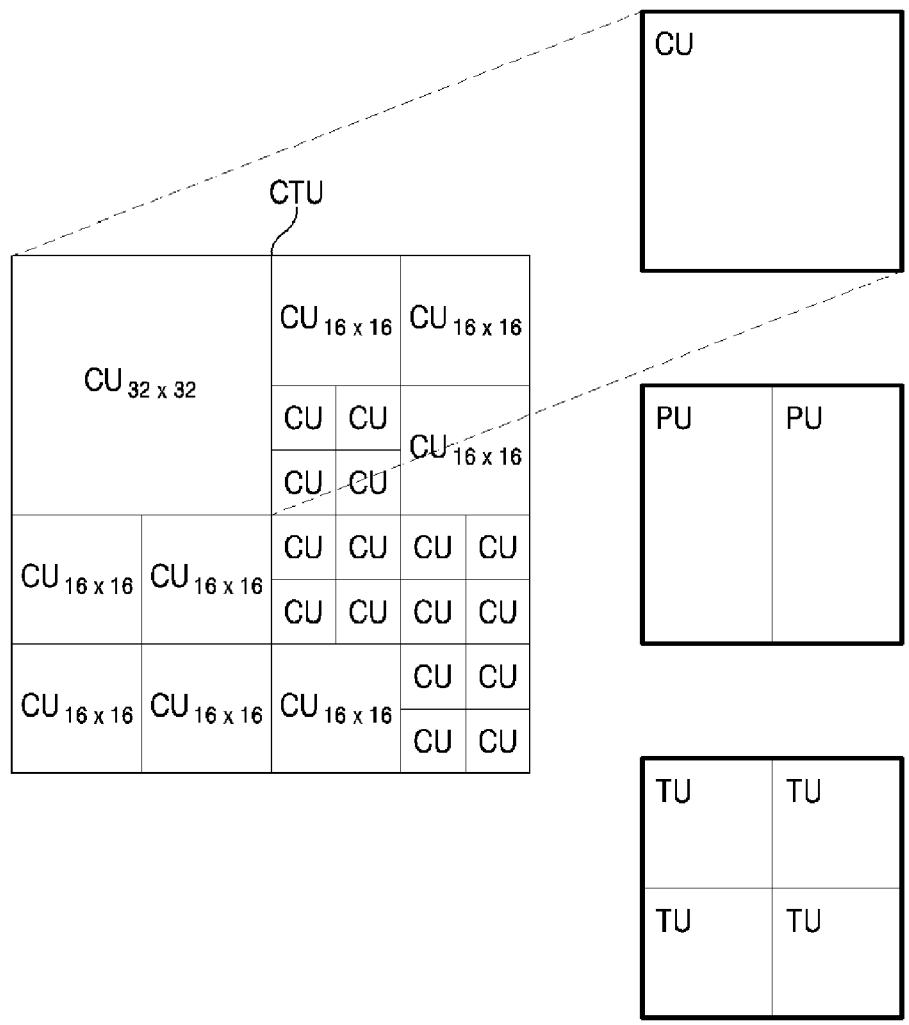
FIG. 5 illustrates one example in which a CTU is partitioned into CUs, PUs, and TUs.
Figure 6:
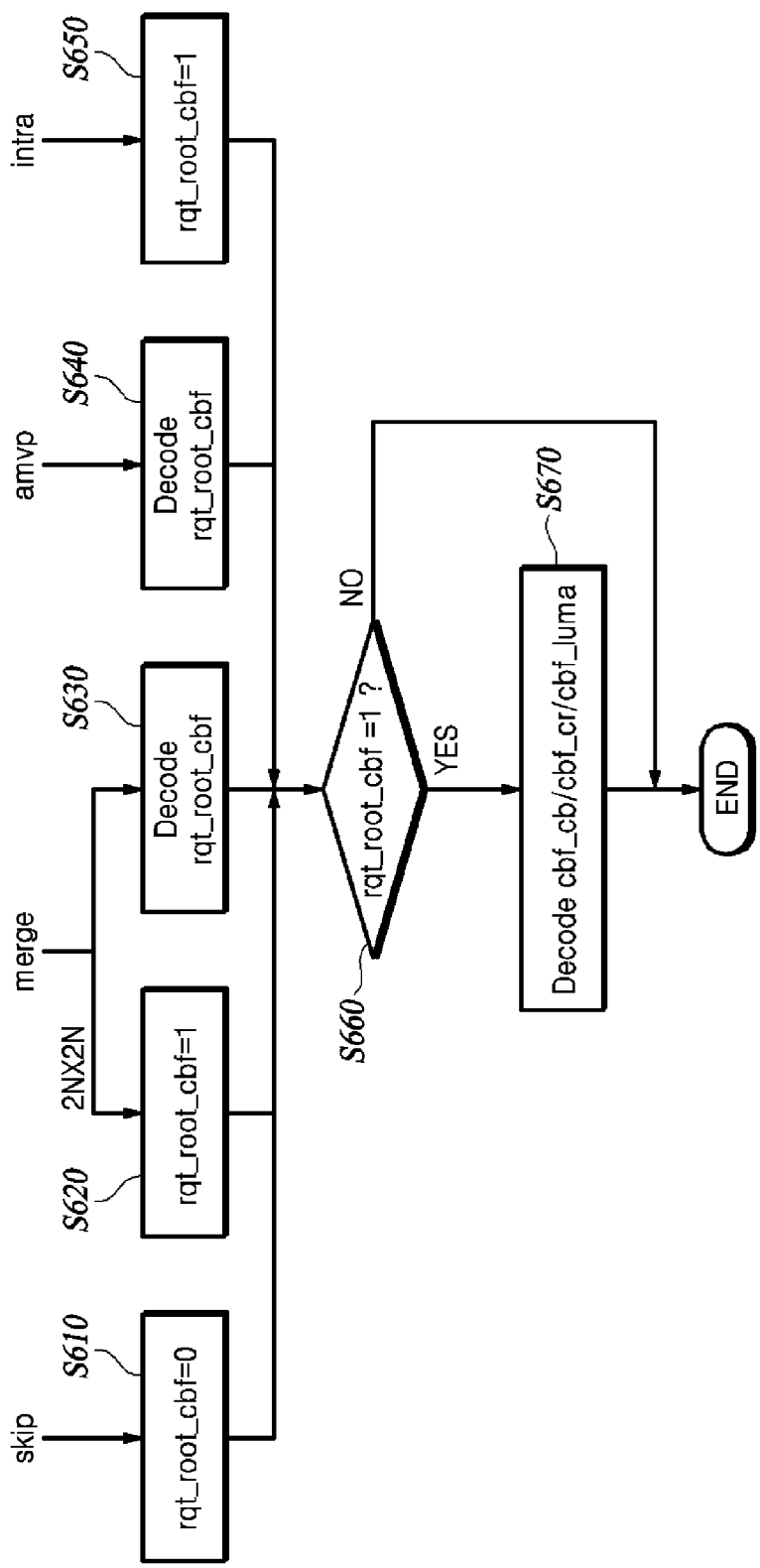
FIG. 6 illustrates the structure of a coded block flag syntax element and a method for signaling the coded block flag syntax element.

As shown in FIG. 5, High Efficiency Video Coding (HEVC) uses a coding tree unit (CTU) of a fixed size as the root node of a tree structure, and a CTU is partitioned into square-shaped coding units (CUs), prediction units (PUs), and transform units (TUs).

A CTU is a block having a maximum size of 64×64 pixels and is repeatedly divided into four quadrants based on the quad-tree structure to obtain CUs exhibiting the best encoding efficiency. The size of a CU may be 32×32 ($CU_{32*32}$), 16×16 ($CU_{16*16}$), and at least 8×8 ($CU_{8*8}$). When a CU is determined, a PU, a basic block for prediction, and a TU, an optimal basic block for transformation, are set in the CU.

One CU is partitioned into a plurality of TUs, and one TU has a respective residual block for each of the Y, the Cb, and the Cr component. Here, the Y component represents the luma component, and the Cb component and the Cr component represent the chroma components (Cb chroma component and Cr chroma component).

A syntax element, which indicates whether one or more non-zero coefficients are included in a residual block (or transform block) of the luma component and a residual block (or transform block) of the chroma component, is signaled from the video encoding apparatus to the video decoding apparatus.

rqt_root_cbf is a coded block flag for one or more TUs included in a specific CU and a transform block of components (Y, Cb, Cr) included in the one or more TUs. Here, the coded block flag indicates whether all coefficient values of the transform block are all zeros. When rqt_root_cbf=0, it indicates that the coefficients of the transform block for all TUs are all zero (accordingly, a transform_tree syntax structure for CU does not exist), and when rqt_root_cbf=1, it indicates that one or more transform blocks having one or more non-zero coefficient values exist (accordingly, a transform_tree syntax structure for CU exists).

Table 1 shows one example of the syntax structure related to rqt_root_cbf.

TABLE 1

| | Descriptor |
|---|---|
| coding_unit( x0, y0, log2CbSize ) { <br>   if( !pcm_flag[ x0 ][ y0 ] ) { <br>     if( CuPredMode[ x0 ][ y0 ] != MODE_INTRA && <br>     !( PartMode = = PART_2Nx2N && merge_flag[ x0 ][ y0 ] ) ) <br>       rqt_root_cbf <br>   if( rqt_root_cbf) { <br>     MaxTrafoDepth = ( CuPredMode[ x0 ][ y0 ] = = MODE_INTRA? <br>       ( max_transform_hierarchy_depth_intra + IntraSplitFlag ) : <br>       max_transform_hierarchy_depth_inter ) <br>     transform_tree( x0, y0, x0, y0, log2CbSize, 0, 0 ) <br>   } <br>   } <br> } | <br><br><br><br>ae(v) |

When rqt_root_cbf=1 (i.e., when a transform_tree syntax structure for a CU exists), syntax elements such as cbf_luma, cbf_cb, and cbf_cr are signaled from the video encoding apparatus to the video decoding apparatus.

cbf_luma is a syntax element indicating whether one or more non-zero transform coefficients exist in the luma transform block, and when cbf_luma=1, it indicates that one or more non-zero transform coefficients exist in the luma transform block. cbf_cb is a syntax element indicating whether one or more non-zero transform coefficients exist in the Cb transform block, and when cbf_cb=1, it indicates that one or more non-zero transform coefficients exist in the Cb transform block. cbf_cr is a syntax element indicating whether one or more non-zero transform coefficients exist in the Cr transform block, and when cbf_cr=1, it indicates that one or more non-zero transform coefficients exist in the Cr transform block.

Table 2 shows one example (transform_tree syntax structure) of the syntax structure related to cbf_luma, cbf_cb, and cbf_cr.

TABLE 2

| | Descriptor |
|---|---|
| transform_tree( x0, y0, xBase, yBase, log2TrafoSize, trafoDepth, blkIdx ) { <br>   if( log2TrafoSize> 2 ) { <br>     if( trafoDepth = = 0 \| \| cbf_cb[ xBase ][ yBase ][ trafoDepth − 1 ] ) <br>       cbf_cb[ x0 ][ y0 ][ trafoDepth ] <br>     if( trafoDepth = = 0 \| \| cbf_cr[ xBase ][ yBase ][ trafoDepth − 1 ] ) <br>       cbf_cr[ x0 ][ y0 ][ trafoDepth ] <br>   } <br>   if( split_transform_flag[ x0 ][ y0 ][ trafoDepth ] ) { <br>     transform_tree( x1, y0, x0, y0, log2TrafoSize − 1, trafoDepth + 1, 1 ) <br>     transform_tree( x0, y1, x0, y0, log2TrafoSize − 1, trafoDepth + 1, 2 ) <br>     transform_tree( x1, y1, x0, y0, log2TrafoSize − 1, trafoDepth + 1, 3 ) <br>   } else { <br>     if( CuPredMode[ x0 ][ y0 ] = = MODE_INTRA \| \| trafoDepth != 0 \| \| <br>       cbf_cb[ x0 ][ y0 ][ trafoDepth ] \| \| cbf_cr[ x0 ][ y0 ][ trafoDepth ] ) <br>       cbf_luma[ x0 ][ y0 ][ trafoDepth ] <br>     transform_unit( x0, y0, xBase, yBase, log2TrafoSize, trafoDepth, blkIdx ) <br>   } <br> } | <br><br><br>ae(v)<br><br>ae(v)<br><br><br><br><br><br><br><br><br>ae(v) |

The video decoding apparatus may decode rqt_root_cbf from the bitstream or infer the value of rqt_root_cbf depending on the encoding/decoding mode (skip, merge, amvp (inter), or intra) of CU, and then determine whether to decode cbf_luma, cbf_cb, and cbf_cr for individual components (Y, Cb, Cr) depending on the value of rqt_root_cbf.

For example, when the encoding/decoding mode of a CU is 'skip', the value of rqt_root_cbf is inferred to 0 (S610), and since rqt_root_cbf=0 (S660), cbf_luma, cbf_cb, and cbf_cr are not decoded. When the encoding/decoding mode of the CU is 'merge', two cases may be performed depending on the block structure of the CU. First, when the block structure of the CU is 2N×2N, the value of rqt_root_cbf is inferred to 1 (S620), and since rqt_root_cbf=1 (S660), cbf_luma, cbf_cb, and cbf_cr are decoded from the bitstream (S670). On the other hand, when the block structure of the CU is not 2N×2N, rqt_root_cbf is decoded from the bitstream (S630), and whether to decode cbf_luma, cbf_cb, and cbf_cr may be determined depending on the value of rqt_root_cbf (S660).

When the encoding/decoding mode of a CU is 'amvp' or 'intra', rqt_root_cbf is decoded from the bitstream (S640, S650), and whether to decode cbf_luma, cbf_cb, and cbf_cr may be determined depending on the value of rqt_root_cbf (S660).

The present disclosure proposes definitions and structures of syntax elements for residual coding of chroma blocks, and semantics for the syntax elements. Also, the present disclosure proposes a method for efficiently designing cbf for two chroma blocks based on the correlation between the Cb chroma block and the Cr chroma block. Furthermore, the present disclosure proposes an encoding/decoding method based on the correlation between a Cb residual block (i.e., residual block of the Cb chroma block) and a Cr residual block (i.e., residual block of the Cr chroma block).

Figure 7:
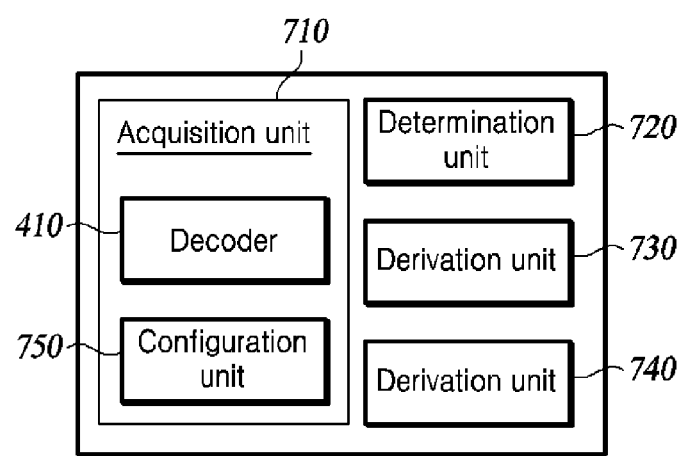
FIG. 7 is an exemplary block diagram of a video decoding apparatus in which a method for reconstructing a residual block of a chroma block based on a JCCR model may be implemented.
Figure 8:
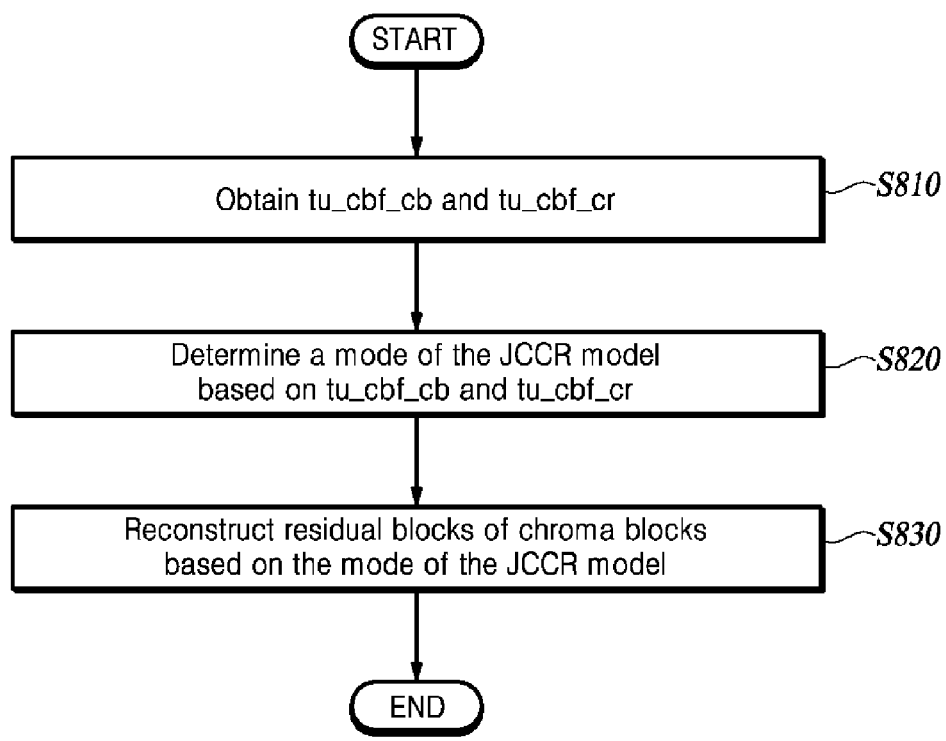
FIG. 8 is a flowchart illustrating a method for reconstructing a residual block of a chroma block based on a JCCR model.
Figure 9:
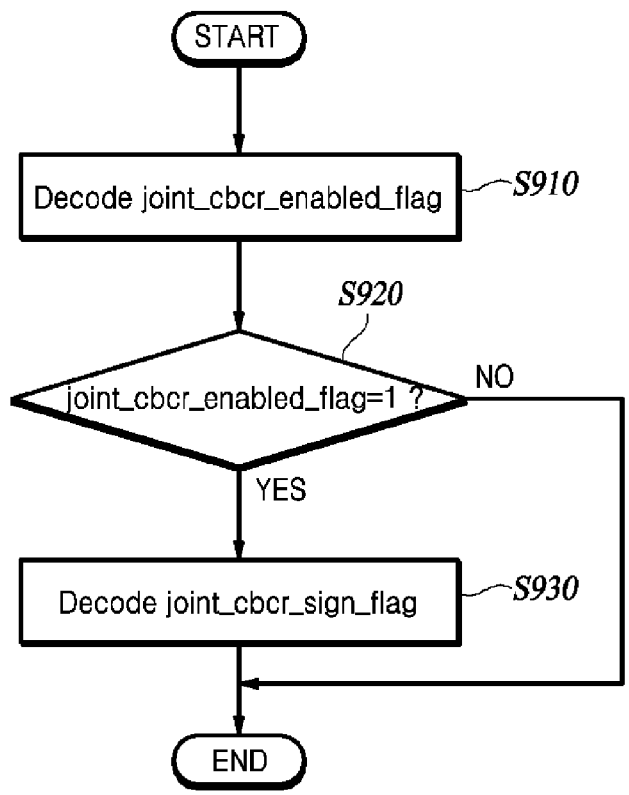
FIG. 9 is a flowchart illustrating high-level syntax of a JCCR model.
Figure 10:
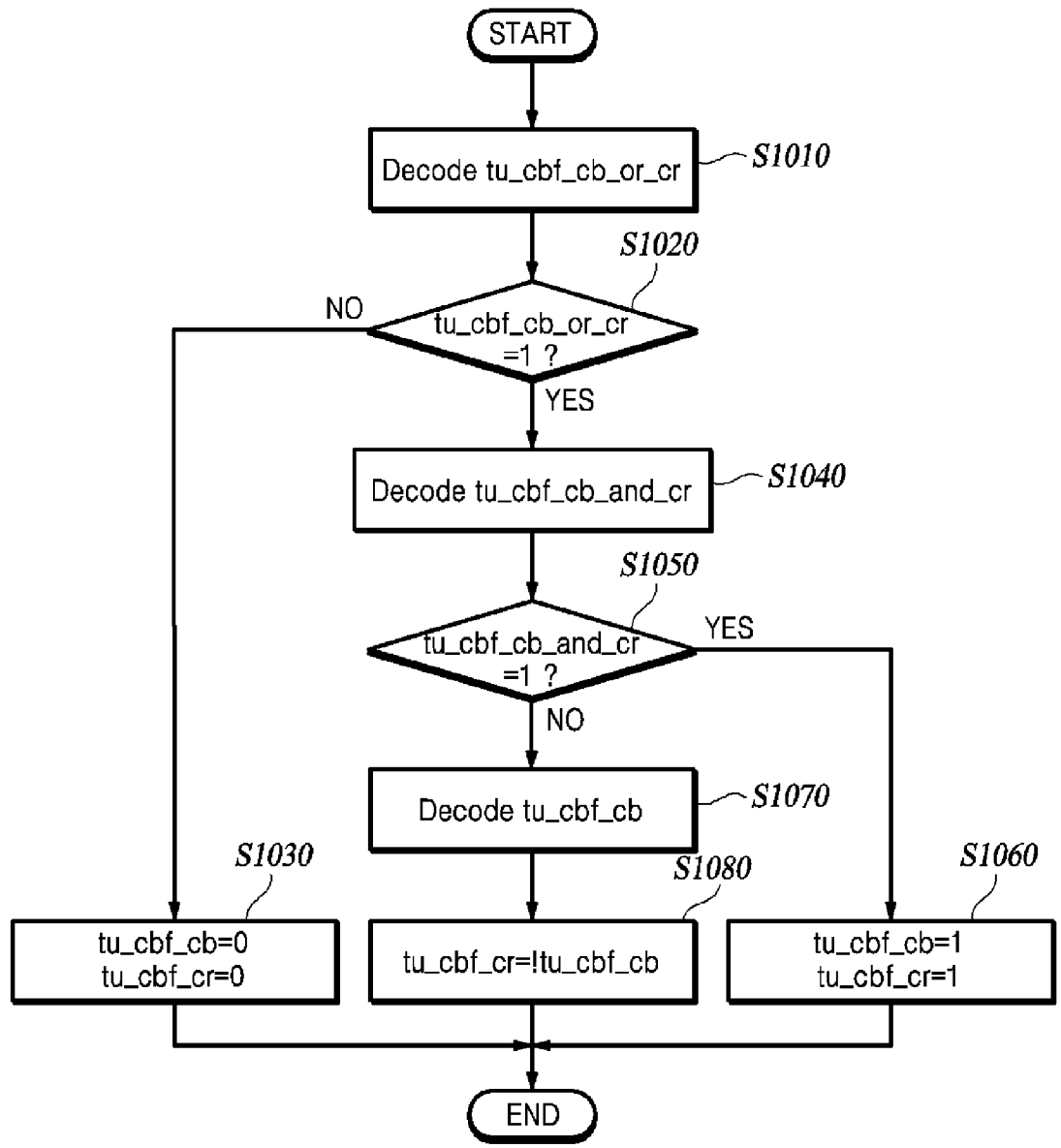
FIGS. 10 and 11 show flowcharts illustrating a method for obtaining a Cb chroma component syntax element and a Cr chroma component syntax element.
Figure 11:
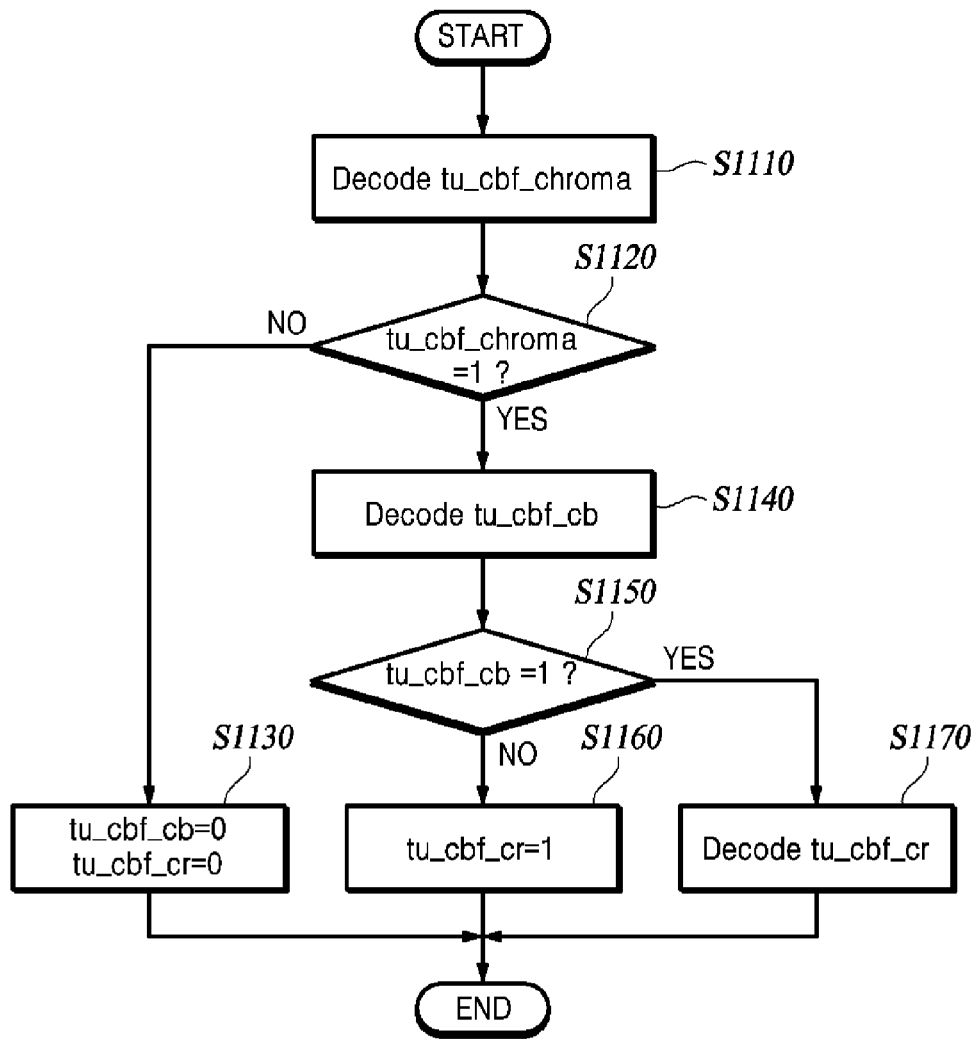
Figure 12:
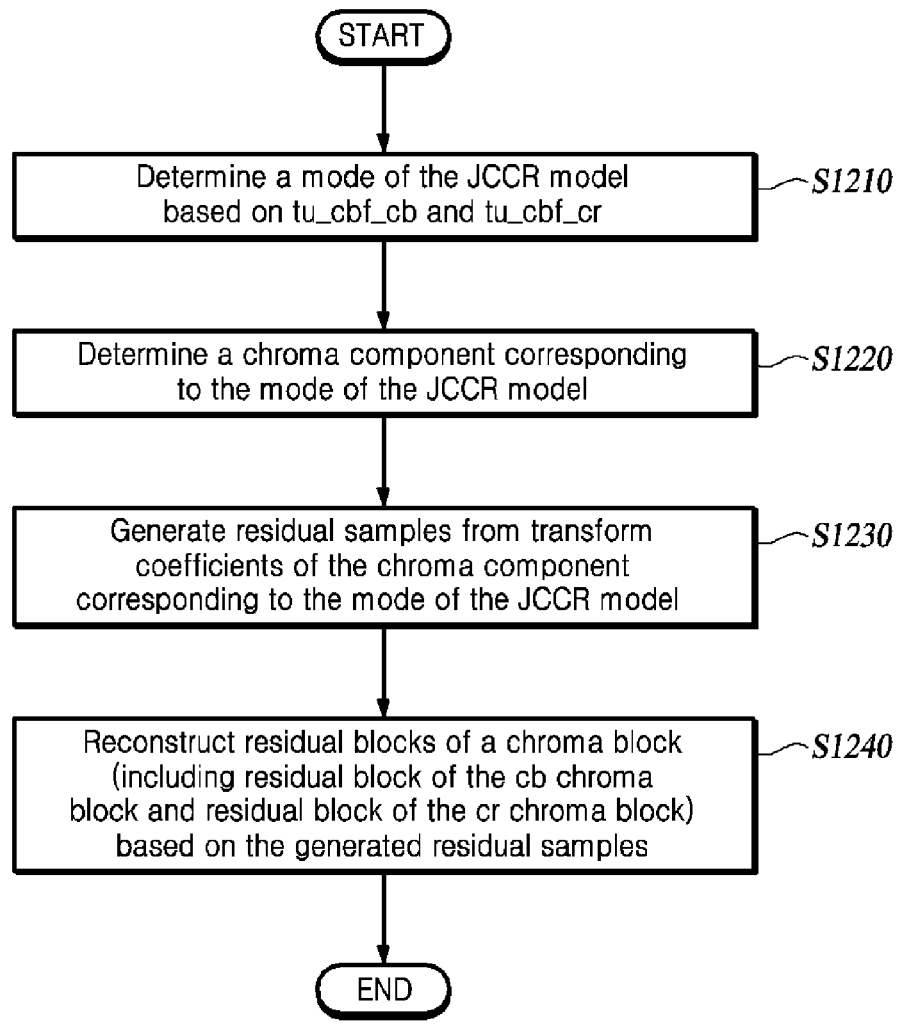
FIGS. 12 and 13 show flowcharts illustrating a method for deriving a residual block of a chroma block based on a JCCR model.

FIG. 7 shows an exemplary block diagram of a video decoding apparatus for implementing the methods above. As shown in FIG. 7, the video decoding apparatus may include an acquisition unit 710, a determination unit 720, a derivation unit 730, and a derivation unit 740. The acquisition unit 710 may include a decoder 410 and a configuration unit 750.

The video encoding apparatus may generate residual blocks for the chroma blocks of a current block by subtracting, from the chroma blocks, the prediction blocks of the chroma blocks. The residual block of the chroma block may include a residual block for the Cb chroma component (i.e., a Cb residual block) and a residual block for the Cr chroma component (i.e., a Cr residual block).

The video encoding apparatus may determine a model for the chroma blocks between a general model that codes both Cb residual samples (i.e., residual samples for the Cb chroma component included within the Cb residual block) and the Cr residual samples (i.e., residual samples for the Cr chroma component included within the Cr residual block) and the JCCR (Joint Coding of Chroma Residuals or Joint Coding of Chrominance Residuals) model.

For example, the video encoding apparatus calculates rate-distortion values through rate-distortion analysis for the general and JCCR models, and uses the model exhibiting the best rate-distortion characteristics for the chroma blocks. The JCCR model will be described in detail later.

When it is determined that the JCCR model is used for the chroma blocks, the video encoding apparatus may determine the mode of the JCCR model based on the correlation between Cb residual samples and Cr residual samples.

Here, the correlation between the Cb residual samples and the Cr residual samples may be divided into three types: (1) The first type relates to the case in which the values of the Cr residual samples are equal to the values obtained by scaling the values of Cb residual samples by ½; (2) the second type relates to the case in which the values of the Cr residual samples are equal to the values obtained by scaling the values of Cb residual samples by 1; and (3) the third type relates to the case in which the values of the Cb residual samples are equal to the values obtained by scaling the values of Cr residual samples by ½.

The video encoding apparatus may determine, for the chroma blocks of the current block, a mode showing the best rate-distortion characteristics among three modes of the JCCR model corresponding to the above three correlations. The video encoding apparatus may integrally perform the "process of determining one between the general model and the JCCR model" and "the process of determining one of the modes of the JCCR model" described above. For example, the video encoding apparatus may determine, for the chroma block, a model or a mode showing the best rate-distortion characteristics among the general model and the modes of the JCCR model.

The video encoding apparatus may encode transform coefficients of either the Cb chroma component or the Cr chroma component to signal the transform coefficients to the video decoding apparatus.

The acquisition unit 710 of the video decoding apparatus may obtain or determine a value of the Cb chroma component syntax element (tu_cbf_cb) and a value of the Cr chroma component syntax element (tu_cbf_cr) (S810).

tu_cbf_cb and tu_cbf_cr may be signaled to the video decoding apparatus by the video encoding apparatus or may be inferred by the video decoding apparatus. Alternatively, one of tu_cbf_cb and tu_cbf_cr may be signaled to the video decoding apparatus, and the other may be inferred from the signaled syntax element (i.e., one of tu_cbf_cb and tu_cbf_cr).

The process of obtaining the values of tu_cbf_cb and tu_cbf_cr may be controlled by a new syntax element introduced in the present disclosure. The process of obtaining the values of tu_cbf_cb and tu_cbf_cr, and the new syntax element will be described in detail later.

The determination unit 720 may determine the mode of the JCCR model based on the values of tu_cbf_cb and tu_cbf_cr S820.

The JCCR model refers to a method or a model that signals either the residual samples of the Cb residual block (i.e., the Cb residual samples) or the residual samples of the Cr residual block (i.e., the Cr residual samples) and derives the un-signaled others based on the correlation with the signaled residual samples.

The JCCR model may be divided into three modes as follows.

(1) JCCR mode 1 (first mode)—The values of Cb residual samples are signaled (or decoded), and the values of Cr residual samples are derived by scaling the values of Cb residual samples by ½.

(2) JCCR mode 2 (second mode)—The values of Cb residual samples are signaled (or decoded), and the values of Cr residual samples are derived by scaling the values of Cb residual samples by 1.

(3) JCCR mode 3 (third mode)—The values of Cr residual samples are signaled (or decoded), and the values of Cb residual samples are derived by scaling the values of Cr residual samples by ½.

The first mode may be performed through Eq. 1, the second mode may be performed through Eq. 2, and the third mode may be performed through Eq. 3.

$$resCb[x][y] = resJointC[x][y]$$

$$resCr[x][y] = (C\ Sign * resJointC[x][y]) \gg 1 \quad [\text{Eq. 1}]$$

$$resCb[x][y] = resJointC[x][y]$$

$$resCr[x][y] = (C\ Sign * resJointC[x][y]) \quad [\text{Eq. 2}]$$

$$resCb[x][y] = (C\ Sign * resJointC[x][y]) \gg 1$$

$$resCr[x][y] = resJointC[x][y] \quad [\text{Eq. 3}]$$

In Eqs. 1 to 3, resCb represents reconstructed Cb residual samples (or Cb residual block), and resCr represents reconstructed Cr residual samples (or Cr residual block). resJointC[x][y] represents the values of signaled residual samples, and CSign represents a sign used to derive the un-signaled residual samples from the signaled residual samples. The value of CSign may be determined by a sign syntax element (joint_cbcr_sign_flag) signaled separately.

The three JCCR modes may be identified by the value of tu_cbf_cb and the value of tu_cbf_cr. When the JCCR model is applied, tu_cbf_cb and tu_cbf_cr may have different meanings from the general meanings (i.e., whether one or more non-zero transform coefficients are included in a transform block), where the different meanings may be identification of the JCCR mode. Table 3 shows an example of identifying the three JCCR modes based on the values of tu_cbf_cb and tu_cbf_cr.

TABLE 3

| JCCR mode | tu_cbf_cb | tu_cbf_cr | Related Eq. |
|---|---|---|---|
| 1 | 1 | 0 | Eq. 1 |
| 2 | 1 | 1 | Eq. 2 |
| 3 | 0 | 1 | Eq. 3 |

When both the values of tu_cbf_cb and tu_cbf_cr are 0, it means that both the Cb residual block and the Cr residual block have all-zero coefficients (indicates the general case). The remaining cases other than the above may distinguish the JCCR modes. The case where tu_cbf_cb=1 and tu_cbf_cr=0 corresponds to the first mode and may be performed through Eq. 1. The case where tu_cbf_cb=1 and tu_cbf_cr=1 corresponds to the second mode and may be performed through Eq. 2. The case where tu_cbf_cb=0 and tu_cbf_cr=1 corresponds to the third mode and may be performed through Eq. 3.

The derivation unit 740 may reconstruct the residual blocks of the chroma blocks by deriving the residual samples of the chroma blocks from the signaled transform coefficients based on the determined JCCR mode (S830).

In the first mode, the values of signaled residual samples are decoded as the values of Cb residual samples, and the Cb residual block and the Cr residual block may be derived from the values of the Cb residual samples (Eq. 1). In the second mode, the values of the signaled residual samples are decoded as the values of the Cb residual samples, and the Cb residual block and the Cr residual block may be derived from the values of the Cb residual samples (Eq. 2). In the third mode, the values of the signaled residual samples are decoded as the values of the Cr residual samples, and the Cb residual block and the Cr residual block may be derived from the values of the Cr residual samples (Eq. 3).

Details of the process of reconstructing the residual blocks will be described later.

Embodiment 1—High-Level Syntax Elements for JCCR Model

Embodiment 1 proposes high-level syntax elements for a JCCR model.

High-level syntax elements for a JCCR model may include an enable flag (joint_cbcr_enabled_flag) and a sign syntax element (joint_cbcr_sign_flag).

joint_cbcr_enabled_flag is a syntax element controlling whether a JCCR model is enabled, and may be defined and signaled at one or more positions among the sequence parameter set (SPS), picture parameter set (PPS), and slice header.

Table 4 shows an example in which joint_cbcr_enabled_flag is defined and signaled (as sps_joint_cbcr_enabled_flag) at the SPS.

TABLE 4

| | Descriptor |
|---|---|
| seq_parameter_set_rbsp( ) { | |
|   sps_joint_cbcr_enabled_flag | u(1) |
| } | | joint_cbcr_sign_flag may be defined and signaled at one or more positions among a picture header, a slice header, and a CTU header. When the JCCR model is applied to a CU included in a certain slice, joint_cbcr_sign_flag may be defined at the corresponding slice header. For all CUs, which are included in the certain slice, to which the JCCR model is applied, the same sign value may be used to derive residual blocks of their chroma blocks. When the JCCR model is applied to a CU included in a certain CTU, joint_cbcr_sign_flag may be defined at the corresponding CTU header. For all CUs, which are included in the certain CTU, to which the JCCR model is applied, the same sign value may be used to derive residual blocks of their chroma blocks.

Table 5 shows an example in which joint_cbcr_sign_flag is defined and signaled (as slice_joint_cbcr_sign_flag) at the slice header.

TABLE 5

| | Descriptor |
|---|---|
| slice_header( ) { | |
|   if( sps_joint_cbcr_enabled_flag ) | |
|     slice_joint_cbcr_sign_flag | u(1) |
| } | |

In some embodiments, joint_cbcr_sign_flag may be signaled on a per-TU basis rather than at high-level syntax. In this way, when the joint_cbcr_sign_flag is signaled on a per-TU basis, the residual blocks of the chroma blocks may be more accurately derived.

Table 6 shows an example in which joint_cbcr_sign_flag is signaled (as tu_joint_cbcr_sign_flag) on a per-TU basis.

TABLE 6

| | Descriptor |
|---|---|
| transform_unit( x0, y0, tbWidth, tbHeight, treeType, subTuIndex ) { | |
|   if( sps_joint_cbcr_enabled_flag && | |
|     ( ( CuPredMode[ chType ][ x0 ][ y0 ] = = MODE_INTRA && tu_cbf_chroma[ x0 ][ y0 ] ) | |
|     || ( tu_cbf_cb[ x0 ][ y0 ] && tu_cbf_cr[ x0 ][ y0 ] ) ) ) | |
|     tu_joint_cbcr_residual[ x0 ][ y0 ] | |
|   if( tu_joint_cbcr_residual[ x0 ][ y0 ] ) | |
|     tu_joint_cbcr_sign_flag[ x0 ][ y0 ] | u(1) |
| } | |

In Table 6, tu_joint_cbcr_residual is an application syntax element that indicates whether to apply the JCCR model to the corresponding TU (on/off), and tu_joint_cbcr_sign_flag may be signaled when tu_joint_cbcr_residual=1. In the present disclosure, tu_joint_cbcr_residual may be the tu_joint_cbcr_residual_flag.

The video decoding apparatus (or the decoder 410 thereof) may decode the joint_cbcr_enabled_flag from the bitstream S910 and may determine whether to decode the joint_cbcr_sign_flag based on the value of the joint_cbcr_enabled_flag S920. Since the JCCR model is not enabled when joint_cbcr_enabled_flag=0, joint_cbcr_sign_flag is not decoded. Contrary to the above, since the JCCR model is enabled when joint_cbcr_enabled_flag=1, joint_cbcr_sign_flag may be decoded from the bitstream S930.

In an embodiment in which joint_cbcr_sign_flag is signaled on a per-TU basis, when joint_cbcr_enabled_flag=1, the process of decoding tujoint_cbcr_residual from a bitstream may be further performed. In this case, tu_joint_cbcr_ sign_flag may be decoded from the bitstream when tujoint_cbcr_residual=1.

Embodiment 2—TU Level Syntax Elements to Specify the Mode of the JCCR Model

Embodiment 2 relates to a method for obtaining values of tu_cbf_cb and tu_cbf_cr.

As described above, tu_cbf_cb and tu_cbf_cr may have two different meanings depending on whether the JCCR model is applied. tu_cbf_cb and tu_cbf_cr may have a meaning that specifies the mode of the JCCR model (see Table 3) when the JCCR model is applied (i.e., tu_joint_cbcr_residual=1), and may have a general meaning when the JCCR model is not applied (i.e., tujoint_cbcr_residual=0). In other words, in the latter case, when tu_cbf_cb=0 or tu_cbf_cr=0, it may mean that the related cb or cr residual block has all-zero coefficients.

To summarize the description above, there may be a total of seven coding types for a residual block, depending on the value of tujoint_cbcr_residual, the value of tu_cbf_cb, and the value of tu_cbf_cr. Table 7 shows the seven coding types for a residual block.

TABLE 7

| case | tu_cbf_cb | tu_cbf_cr | tu_joint_cbcr_residual |
|---|---|---|---|
| 1 | 1 | 1 | 0 |
| 2 | 1 | 1 | 1 |
| 3 | 1 | 0 | 0 |
| 4 | 1 | 0 | 1 |
| 5 | 0 | 1 | 0 |
| 6 | 0 | 1 | 1 |
| 7 | 0 | 0 | — |

Case 7 represents a case in which both the Cb residual block and the Cr residual block have all-zero coefficients. Case 1, Case 3, and Case 5 indicate cases in which tu_cbf_cb and tu_cbf_cr have general meanings. Cases 2, 4, and 6 indicate cases in which tu_cbf_cb and tu_cbf_cr are used to distinguish the JCCR mode.

Embodiment 2 proposes two embodiments for efficiently signaling tu_joint_cbcr_residual, tu_cbf_cb, and tu_cbf_cr. These two embodiments are designed by considering the frequency of occurrences of the value of tu_cbf_cb and the value of tu_cbf_cr. For example, when TUs are encoded and decoded based on inter prediction, the occurrence frequency of residual blocks (or transform blocks) having all-zero coefficients may be relatively high due to high prediction accuracy of the inter prediction. In other words, the case where tu_cbf_cb=0 and tu_cbf_cr=0 may occur most often. Therefore, as in the following embodiments, the bit efficiency may be improved by performing a logical OR of tu_cbf_cb and tu_cbf_cr and first checking the case where tu_cbf_cb=0 and tu_cbf_cr=0.

Embodiment 2-1

Embodiment 2-1 proposes two new syntax elements for obtaining (or expressing) the value of tu_cbf_cb and the value of tu_cbf_cr. The new syntax elements are 'tu_cbf_cb_or_cr' and 'tu_cbf_cb_and_cr'.

tu_cbf_cb_or_cr is a syntax element indicating the logical OR of tu_cbf_cb and tu_cbf_cr (i.e., tu_cbf_cb II tu_cbf_cr). In other words, tu_cbf_cb_or_cr may indicate whether at least one of tu_cbf_cb and tu_cbf_cr is 1. When tu_cbf_cb_or_cr=0, it indicates that both the value of tu_cbf_cb and the value of tu_cbf_cr are 0. When tu_cbf_cb_or_cr=1, it may indicate that at least one of the value of tu_cbf_cb and the value of tu_cbf_cr is 1.

tu_cbf_cb_and_cr is a syntax element indicating the logical AND of tu_cbf_cb and tu_cbf_cr (i.e., tu_cbf_cb && tu_cbf_cr). In other words, tu_cbf_cb_and_cr may indicate whether both the value of tu_cbf_cb and the value of tu_cbf_cr are 1. When tu_cbf_cb_and_cr=0, it indicates that at least one of the value of tu_cbf_cb and the value of tu_cbf_cr is 0. When tu_cbf_cb_and_cr=1, it may indicate that both the value of tu_cbf_cb and the value of tu_cbf_cr are 1.

First, tu_cbf_cb_or_cr may be signaled from the video encoding apparatus to the video decoding apparatus, and may be decoded by the video decoding apparatus (S1010).

When tu_cbf_cb_or_cr=0 (accordingly, tu_cbf_cb=0 and tu_cbf_cr=0) (S1020), tu_cbf_cb and tu_cbf_cr are not signaled, and tu_cbf_cb_cr and tu_cbf_cb_cr may be set to 0 in the video decoding device (or the configuration unit 750 thereof) (S1030). On the other hand, when tu_cbf_cb_or_cr=1 (accordingly, at least one of tu_cbf_cb and tu_cbf_cr is 1) (S1030), tu_cbf_cb_and_cr may be signaled and decoded (S1040).

When tu_cbf_cb_and_cr=1 (S1050), since both tu_cbf_cb and tu_cbf_cr are 1, tu_cbf_cb and tu_cbf_cr are not signaled, and tu_cbf_cb and tu_cbf_cr may be set to 1 (S1060). On the other hand, when tu_cbf_cb_and_cr=0 (S1050), since only one of tu_cbf_cb and tu_cbf_cr is 1, a target syntax element, which is either tu_cbf_cb or tu_cbf_cr, may be signaled and decoded (S1070). The value of the target syntax element may be set to the value decoded in S1070. The value of a syntax element other than the target syntax element (i.e., the other one between tu_cbf_cb and tu_cbf_cr) may be set to the value opposite to the value of the target syntax element (accordingly, tu_cbf_cb !=tu_cbf_cr) (S1080).

tu_joint_cbcr_residual may be signaled from the video encoding apparatus to the video decoding apparatus when either one of the following two conditions is satisfied while the JCCR model is enabled.

(1) Condition 1—When the encoding/decoding mode of the related TU is intra and tu_cbf_cb_or_cr=1 (i.e., at least one of tu_cbf_cb and tu_cbf_cr is equal to 1).

(2) Condition 2—When the encoding/decoding mode of the related TU is not intra and tu_cbf_cb_and_cr=1 (i.e., both tu_cbf_cb and tu_cbf_cr are equal to 1).

To describe the above conditions in detail, when the related TU is encoded/decoded in intra mode and at least one of tu_cbf_cb and tu_cbf_cr is 1, the JCCR model can be turned on/off (condition 1). When the related TU is encoded/decoded in inter mode and both tu_cbf_cb and tu_cbf_cr are 1, the JCCR model can be turned on/off (condition 2). For example, when a TU is encoded are decoded in intra mode, all of the first to third modes of Table 3 are applicable, and when a TU is encoded and decoded in inter mode, only the third mode of Table 3 may be applicable.

Table 8 shows the syntax structure of embodiment 2-1 described above.

First, tu_cbf_chroma may be signaled from the video encoding apparatus to the video decoding apparatus and decoded by the video decoding apparatus (S1110).

When tu_cbf_chroma=0 (accordingly, tu_cbf_cb=0 and tu_cbf_cr=0) (S1120), tu_cbf_cb and tu_cbf_cr are not signaled and tu_cbf_cb and tu_cbf_cr may be set to 0 in the video decoding device (or the configuration unit 750 thereof) (S1130). On the other hand, when tu_cbf_chroma=1 (accordingly, at least one of tu_cbf_cb and tu_cbf_cr is 1) (S1030), a target syntax element, which is either tu_cbf_cb

TABLE 8

| | Descriptor |
|---|---|
| transform_unit( x0, y0, tbWidth, tbHeight, treeType, subTuIndex ) { <br>  if( ( treeType = = SINGLE_TREE \| \| treeType = = DUAL_TREE_CHROMA ) && <br>      ChromaArrayType != 0 ) { <br>    if( ( IntraSubPartitionsSplitType = = ISP_NO_SPLIT && !( cu_sbt_flag && <br>       ( ( subTuIndex = = 0 && cu_sbt_pos_flag ) \|\| <br>        ( subTuIndex = = 1 && !cu_sbt_pos_flag ) ) ) ) \|\| <br>     ( IntraSubPartitionsSplitType != ISP_NO_SPLIT && <br>      ( subTuIndex = = NumIntraSubPartitions − 1 ) ) ) <br>    tu_cbf_cb_or_cr[ x0 ][ y0 ] <br>  } <br>  if( tu_cbf_cb_or_cr[ x0 ][ y0 ] ) { <br>    tu_cbf_cb_and_cr[ x0 ][ y0 ] <br>    if( tu_cbf_cb_and_cr[ x0 ][ y0 ] ) { <br>      tu_cbf_cb[ x0 ][ y0 ] = true <br>      tu_cbf_cr[ x0 ][ y0 ] = true <br>    } <br>    else <br>      tu _cbf_cb[ x0 ][ y0 ] <br>    if( tu_cbf_cb[ x0 ][ y0 ] ) <br>      tu_cbf_cr[ x0 ][ y0 ] = false <br>    else <br>      tu_cbf_cr[ x0 ][ y0 ] = true <br>  } <br>  else { <br>    tu_cbf_cb[ x0 ][ y0 ] = false <br>    tu_cbf_cr[ x0 ][ y0 ] = false <br>  } <br>  if( sps_joint_cbcr_enabled_flag && <br>    ( ( CuPredMode[ chType ][ x0 ][ y0 ] = = MODE_INTRA && <br>    tu_cbf_cb_or_cr[ x0 ][ y0 ] ) \|\| tu_cbf_cb_and_cr[ x0 ][ y0 ] ) ) <br>    tu_joint_cbcr_residual[ x0 ][ y0 ] <br>  if( tu_cbf_cb[ x0 ][ y0 ] ) <br>    residual_coding( xC, yC, Log2( wC ), Log2( hC ), 1 ) <br>  if( tu_cbf_cr[ x0 ][ y0 ] && <br>    !( tu_cbf_cb[ x0 ][ y0 ] && tu_joint_cbcr_residual_flag[ x0 ][ y0 ] )) <br>    residual_coding( xC, yC, Log2( wC ), Log2( hC ), 2 ) <br>} | <br><br><br><br><br><br><br><br>ae(v) |

Embodiment 2-2

Embodiment 2-2 proposes a new syntax element for obtaining (or expressing) the value of tu_cbf_cb and the value of tu_cbf_cr. The new syntax element is tu_cbf_chroma.

tu_cbf_chroma is a syntax element indicating the logical OR of tu_cbf_cb and tu_cbf_cr (i.e., tu_cbf_cb II tu_cbf_cr). In other words, tu_cbf_chroma may indicate whether at least one of the value of tu_cbf_cb and the value of tu_cbf_cr is 1. When tu_cbf_chroma=0, it may indicate that both the value of tu_cbf_cb and the value of tu_cbf_cr are 0, and when tu_cbf_chroma=1, it may indicate that at least one of the value of tu_cbf_cb and the value of tu_cbf_cr is 1.

or tu_cbf_cr, may be signaled and decoded (S1140). The value of the target syntax element may be set to the value decoded in S1140.

When the target syntax element=1, a syntax element other than the target syntax element (i.e., the other one between tu_cbf_cb and tu_cbf_cr) may be further signaled and decoded (S1170). The value of the other syntax element may be set to the value decoded in S1170. On the other hand, when the target syntax element=0, the value of the other syntax element may be inferred or set to the value opposite to the value of the target syntax element (tu_cbf_cr=1) (S1160).

tu_joint_cbcr_residual may be signaled from the video encoding apparatus to the video decoding apparatus when either one of the two conditions the same as embodiment 2-1 is satisfied while the JCCR model is enabled.

Table 9 shows the syntax structure of embodiment 2-2 described above.

TABLE 9

| | Descriptor |
|---|---|
| transform_unit( x0, y0, tbWidth, tbHeight, treeType, subTuIndex ) {    if( ( treeType = = SINGLE_TREE | | treeType = = DUAL_TREE_CHROMA ) &&        ChromaArrayType != 0 ) {     if( ( IntraSubPartitionsSplitType = = ISP_NO_SPLIT && !( cu_sbt_flag &&       ( ( subTuIndex = = 0 && cu_sbt_pos_flag ) | |        ( subTuIndex = = 1 && !cu _sbt_pos_flag ) ) ) ) | |     ( IntraSubPartitionsSplitType != ISP_NO_SPLIT &&       ( subTuIndex = = NumIntraSubPartitions − 1 ) ) )      tu_cbf_chroma[ x0 ][ y0 ] | ae(v) |
| }   if( tu_cbf_chroma[ x0 ][ y0 ] ) {     tu_cbf_cb[ x0 ][ y0 ]     if( tu_cbf_cb[ x0 ][ y0 ] )       tu_cbf_cr[ x0 ][ y0 ]     else       tu_cbf_cr[ x0 ][ y0 ] = true   }   else {     tu_cbf_cb[ x0 ][ y0 ] = false     tu_cbf_cr[ x0 ][ y0 ] = false   }   if( sps_joint_cbcr_enabled_flag &&     ( ( CuPredMode[ chType ][ x0 ][ y0 ] = = MODE_INTRA &&       tu_cbf_chroma[ x0 ][ y0 ] ) | | ( tu_cbf_cb[ x0 ][ y0 ] && tu_cbf_cr[ x0 ][ y0 ] ) ) )     tu_joint_cbcr_residual[ x0 ][ y0 ]   if( tu_cbf_cb[ x0 ][ y0 ] )     residual_coding( xC, yC, Log2( wC ), Log2( hC ), 1 )   if( tu_cbf_cr[ x0 ][ y0 ] &&     !( tu_cbf_cb[ x0 ][ y0 ] && tu_joint_cbcr_residual_flag[ x0 ][ y0 ] ))     residual_coding( xC, yC, Log2( wC ), Log2( hC ), 2 ) } | |

Embodiment 3—Decoding Process Based on JCCR Model

Embodiment 3 relates to a method for reconstructing residual blocks of chroma blocks based on the JCCR mode.

As described above, the video encoding apparatus may encode transform coefficients of either the Cb chroma component or the Cr chroma component to signal the transform coefficients to the video decoding apparatus. Here, the transform coefficients signaled to the video decoding apparatus may be the transform coefficients of the chroma component corresponding to the JCCR mode between the Cb chroma component and the Cr chroma component. For example, when the JCCR mode is the first mode or the second mode, transform coefficients of the Cb chroma component are signaled, and when the JCCR mode is the third mode, transform coefficients of the Cr chroma component are signaled.

Once the JCCR mode is determined based on tu_cbf_cb and tu_cbf_cr (S1210), the video decoding apparatus (or the derivation unit 730 thereof) may determine or set which chroma component corresponds to the JCCR mode (S1220).

To express which chroma component corresponds to the JCCR mode, a separate variable may be used. The separate variable may be compIdx or codedCIdx (hereafter, it is denoted as compIdx). The Cb chroma component corresponding to the first mode and the second mode may be expressed as compIdx=1, and the Cr chroma component corresponding to the third mode may be expressed as compIdx=2.

The video decoding apparatus (or the derivation unit 730 thereof) may generate residual samples of the corresponding chroma component from the transform coefficients of the corresponding chroma component (S1230).

For example, when compIdx=1 (as in the first and second modes), residual samples of the Cb chroma component (simply, Cb residual samples) may be generated from the transform coefficients of the Cb chroma component. When compIdx=2 (as in the third mode), residual samples of the Cr chroma component (simply, Cr residual samples) may be generated from the transform coefficients of the Cr chroma component. The process of generating residual samples of the chroma component may be accomplished by inversely transforming the transform coefficients of the chroma component signaled in the bitstream.

The video decoding apparatus (the derivation unit 740 thereof) may reconstruct residual blocks of the chroma blocks using the generated residual samples (S1240).

The process (S1240) of reconstructing the residual blocks of the chroma blocks may include a process of reconstructing the Cb residual block and a process of reconstructing the Cr residual block. In other words, the process of reconstructing residual block of the chroma block may be performed repeatedly for two chroma components. For example, when Cb residual samples are generated from transform coefficients (compIdx=1, cIdx=1), the video decoding apparatus may perform both the process of generating a Cb residual block by using the Cb residual samples and the process of deriving a Cr residual block based on the Cb residual samples. As another example, when a Cr residual sample is generated form transform coefficients (compIdx=2, cIdx=2), the video decoding apparatus may perform both the process of generating a Cb residual block by using the Cr residual samples and the process of deriving a Cr residual block based on the Cr residual samples.

If the descriptions above are rephrased based on the chroma components, the video decoding apparatus may change the processing order of the Cb chroma component and the Cr chroma component based on the value of compIdx (i.e., JCCR mode).

For example, when compIdx=1 (i.e., in the first mode or the second mode), the video decoding apparatus may first generate residual samples of the Cb chroma component (Cb chroma component processing), and then may derive the residual samples of the Cr chroma component (Cr chroma component processing). As another example, when compIdx=2 (i.e., in the third mode), the video decoding apparatus may first generate residual samples of the Cr chroma component (Cr chroma component processing), and then may derive residual samples of the Cb chroma component (Cb chroma component processing).

The reason why the present disclosure changes the processing order of the Cb chroma component and the Cr chroma component based on the value of compIdx (or based on the JCCR mode) is to solve the problem involved in conventional methods that first performs processing of the Cb chroma component and performs processing the Cr chroma component later regardless of the value of compIdx (or the JCCR mode).

Specifically, since the conventional methods perform processing of the Cb chroma component first even in the third mode (where compIdx=2), deriving the Cb residual blocks may not be properly dealt with due to the absence of the information on the Cr residual samples. The problem above may be solved since the present disclosure is configured to first process the Cr chroma component in the case of the third mode (where compIdx=2).

In some embodiments, residual samples generated from the transform coefficients of the chroma component may be stored in the memory 470 or other storage space in advance. In this case, the "stored residual samples" may be used in the process of reconstructing the residual blocks of the chroma blocks. For example, in the third mode (where compIdx=2), to reconstruct the Cb residual block, the Cb residual block is derived by using the stored Cr residual samples, and to reconstruct the Cr residual block, the stored Cr residual samples are allocated directly to sample locations the Cr residual blocks.

Figure 13:

FIG. 13 shows one example of a specific method for reconstructing residual blocks of the chroma blocks.

The video decoding apparatus may determine, based on the value of joint_cbcr_residual, whether the JCCR model is applied to the chroma blocks (S1310). When joint_cbcr_residual=0, the JCCR model is not applied, and thus the residual block reconstruction method based on the JCCR model is terminated. However, when joint_cbcr_residual=1, the process (S1320 to S1360) of determining the JCCR mode may be performed.

The video decoding apparatus may determine whether tu_cbf_cb=1 and tu_cbf_cr=0 (S1320). When tu_cbf_cb=0 or tu_cbf_cr=1, the video decoding apparatus may determine whether tu_cbf_cb=1 (S1340). Based on the determination results of S1320 and S1340, the video decoding apparatus may determine the JCCR mode (S1330, S1350, S1360). When tu_cbf_cb=1 and tu_cbf_cr=0, the video decoding apparatus determines that the JCCR mode is the first mode (S1330). When tu_cbf_cb=1 and tu_cbf_cr=1, the video decoding apparatus determines that the JCCR mode is the second mode (S1350). When tu_cbf_cb=0 and tu_cbf_cr=1, the video decoding apparatus determines that the JCCR mode is the third mode (S1360).

The video decoding apparatus may derive the value of Csign (S1370). This process may be performed by applying, to Eq. 4, the sign syntax element (joint_cbcr_sign_flag) decoded from the bitstream.

$$\text{Csign}=(1-2*\text{joint\_cbcr\_sign\_flag}) \qquad [\text{Eq. 4}]$$

The video decoding apparatus may determine the chroma component (compIdx) corresponding to the JCCR mode (S1380 to S1384).

When the JCCR mode is the first mode or the second mode (JCCR mode≤2) (S1380), the video decoding apparatus may determine that compIdx=1 (cb) (S1382), and when the JCCR mode is the third mode (S1380), the video decoding apparatus may determine that compIdx=2 (cr) (S1384).

After generating "residual samples of the corresponding chroma component" from the "transform coefficients of the corresponding chroma component," the video decoding apparatus may reconstruct the corresponding residual blocks by deriving residual blocks of the chroma blocks based on the generated residual samples (S1386 to S1394).

The process of generating residual samples of the corresponding chroma component may be performed by inversely transforming the transform coefficients of the corresponding chroma component. Also, the process of reconstructing residual blocks may include a process of determining whether cIdx is equal to compIdx (S1386), a process of determining whether the JCCR mode is the second mode when cIdx is not equal to compIdx (S1390), and the processes of deriving residual blocks based on Eqs. 1 to 3 (S1388, S1392, S1394).

For example, when tu_cbf_cb=1 and tu_cbf_cr=0 (accordingly, JCCR mode=first mode, compIdx=1), residual samples (res(compIdx=1)) of the Cb chroma component may be generated from the transform coefficients of the Cb chroma component (cIdx=1). In the case of the Cb chroma component (cIdx=1), since cIdx=compIdx=1 (S1386), res (compIdx=1) is allocated to the Cb residual block (resSam (cIdx=1)), and thereby the Cb residual block may be reconstructed (S1388). In the case of the Cr chroma component (cIdx=2), since cIdx is not equal to compIdx (S1386), and JCCR mode is not the second mode (S1390), Cr residual block (resSam(cIdx=2)) may be derived based on the residual samples (res(compIdx)) of the Cb chroma component (S1394).

In another example, when tu_cbf_cb=1 and tu_cbf_cr=1 (accordingly, JCCR mode=second mode, compIdx=1), residual samples (res(compIdx=1)) of the Cb chroma component may be generated from the transform coefficients of the Cb chroma component (cIdx=1). In the case of the Cb chroma component (cIdx=1), since cIdx=compIdx=1 (S1386), res(compIdx=1) is allocated to the Cb residual block (resSam(cIdx=1)), and thereby the Cb residual block may be reconstructed (S1388). In the case of the Cr chroma component (cIdx=2), since cIdx is not equal to compIdx S1386, and JCCR mode is not the second mode (S1390), Cr residual block (resSam(cIdx=2)) may be derived based on the residual samples (res(compIdx)) of the Cb chroma component S1392.

In yet another example, when tu_cbf_cb=0 and tu_cbf_cr=1 (accordingly, JCCR mode=third mode, compIdx=2), residual samples (res(compIdx=2)) of the Cr chroma component may be generated from the transform coefficients of the Cr chroma component (cIdx=2). In the case of the Cr chroma component (cIdx=2), since cIdx=compIdx=2 (S1386), res(compIdx=2) is allocated to the Cr residual block (resSam(cIdx=2)), and thereby the Cr residual block may be reconstructed (S1388). In the case of the Cb chroma component (cIdx=1), since cIdx is not equal to compIdx (S1386), and JCCR mode is not the second mode S1390, Cb residual block (resSam(cIdx=2)) may be derived based on the residual samples (res(compIdx)) of the Cr chroma component S1392.

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method for reconstructing residual blocks of chroma blocks based on a Joint Coding of Chroma Residuals (JCCR) model, the method comprising:
   determining a value of a first coded block flag and a value of a second coded block flag for the chroma blocks, wherein the first coded block flag indicates whether one or more non-zero transform coefficients exist in a Cb transform block and the second coded block flag indicates whether one or more non-zero transform coefficients exist in a Cr transform block;
   determining a mode of the JCCR model among available modes based on the value of the first coded block flag and the value of the second coded block flag;
   determining, based on the mode of the JCCR model, a first chroma component whose transform coefficients are to be decoded from a bitstream among a Cb chroma component and a Cr chroma component;
   decoding, from the bitstream, the transform coefficients of the first chroma component;
   generating residual samples of the first chroma component by performing inverse transform on the transform coefficients; and
   deriving residual samples of a second chroma component, among the Cb chroma component and the Cr chroma component, based on the generated residual samples of the first chroma component,
   wherein the determining of the value of the first coded block flag and the value of the second block flag includes:
      decoding, from the bitstream, a first syntax element indicating whether at least one of the first coded block flag and the second coded block flag is equal to 1;
      when the first syntax element is equal to 1, decoding, from the bitstream, a target coded block flag which is one of the first coded block flag and the second coded block flag; and
      when the target coded block flag is equal to 1, decoding, from the bitstream, the other coded block flag rather than the target coded block flag,
      wherein when the target coded block flag is equal to 0, decoding of the other coded block flag is skipped and the other coded block flag is set equal to 1,
      wherein when the first syntax element is equal to 0, decoding of both the target coded block flag and the other coded block flag is skipped and both the target coded block flag and the other coded block flag are set equal to 0.

2. The method of claim 1, further comprising:
   decoding an application syntax element indicating whether to apply the JCCR model from the bitstream, wherein the determining of the mode of the JCCR model is performed when the application syntax element indicates that the JCCR model is applied, and wherein the application syntax element is decoded, when at least one of the first coded block flag and the second coded block flag is equal to 1 and a prediction mode of the chroma block is intra mode, or when both the first coded block flag and the second coded block flag are equal to 1.

3. A method for encoding residual blocks of chroma blocks based on a Joint Coding of Chroma Residuals (JCCR) model, the method comprising:
   generating residual samples of a Cb chroma component and residual samples of a Cr chroma component;
   determining a mode of the JCCR model among available modes for the chroma blocks;
   encoding, into a bitstream, one or more syntax elements which represent a value of a first coded block flag and a value of a second coded block flag to signal the mode of the JCCR model, wherein each of the available modes is specified based on the value of the first coded block flag and the value of the second coded block flag, and wherein the first coded block flag indicates whether one or more non-zero transform coefficients exist in a Cb transform block and the second coded block flag indicates whether one or more non-zero transform coefficients exist in a Cr transform block;
   determining, based on the mode of the JCCR model, a first chroma component whose transform coefficients are to be encoded into the bitstream and a second chroma component whose transform coefficients are not to be encoded into the bitstream, among a Cb chroma component and a Cr chroma component;
   generating transform coefficients residual samples of the first chroma component by performing transform on the residual samples of the first chroma component; and
   encoding, into the bitstream, the transform coefficients of the first chroma component,
   wherein the encoding of one or more syntax elements includes:
      encoding, into the bitstream, a first syntax element indicating whether at least one of the first coded block flag and the second coded block flag is equal to 1;
      when the first syntax element is equal to 1, encoding, into the bitstream, a target coded block flag which is one of the first coded block flag and the second coded block flag; and
      when the target coded block flag is equal to 1, encoding, into the bitstream, the other coded block flag rather than the target coded block flag,
      wherein when the target coded block flag is equal to 0, encoding of the other coded block flag is skipped and the other coded block flag is set equal to 1,
      wherein when the first syntax element is equal to 0, encoding of both the target coded block flag and the other coded block flag is skipped and both the target coded block flag and the other coded block flag are set equal to 0.

4. A method for providing a video decoding device with video data, the method comprising:
   encoding the video data into a bitstream; and
   transmitting the bitstream to the video decoding device, wherein the encoding of the video data includes:
      generating residual samples of a Cb chroma component and residual samples of a Cr chroma component for chroma blocks;
      determining a mode of the Joint Coding of Chroma Residuals (JCCR) model among available modes for the chroma blocks;
      encoding, into a bitstream, one or more syntax elements which represent a value of a first coded block flag and a value of a second coded block flag to signal the mode of the JCCR model, wherein each of the available modes is specified based on the value of the first coded block flag and the value of the second coded block flag, and wherein the first coded block flag indicates whether one or more non-zero transform coefficients exist in a Cb transform block, and the second coded block flag indicates whether one or more non-zero transform coefficients exist in a Cr transform block;

determining, based on the mode of the JCCR model, a first chroma component whose transform coefficients are to be encoded into the bitstream and a second chroma component whose transform coefficients are not to be encoded into the bitstream, among a Cb chroma component and a Cr chroma component;

generating transform coefficients residual samples of the first chroma component by performing transform on the residual samples of the first chroma component; and encoding, into the bitstream, the transform coefficients of the first chroma component, wherein the encoding of one or more syntax elements includes:
  encoding, into the bitstream, a first syntax element indicating whether at least one of the first coded block flag and the second coded block flag is equal to 1;
  when the first syntax element is equal to 1, encoding, into the bitstream, a target coded block flag which is one of the first coded block flag and the second coded block flag; and
  when the target coded block flag is equal to 1, encoding, into the bitstream, the other coded block flag rather than the target coded block flag,
  wherein when the target coded block flag is equal to 0, encoding of the other coded block flag is skipped and the other coded block flag is set equal to 1,
  wherein when the first syntax element is equal to 0, encoding of both the target coded block flag and the other coded block flag is skipped and both the target coded block flag and the other coded block flag are set equal to 0.

* * * * *